United States Patent
Qin et al.

(10) Patent No.: US 12,286,385 B2
(45) Date of Patent: Apr. 29, 2025

(54) SOIL MICROBIAL REGULATOR FOR ENHANCING PLANT STRESS RESISTANCE

(71) Applicant: HAINAN UNIVERSITY, Hainan (CN)

(72) Inventors: Chunxiu Qin, Hainan (CN); Wenbo Liu, Hainan (CN); Pengfei Jin, Hainan (CN); Chunhua Lin, Hainan (CN)

(73) Assignee: HAINAN UNIVERSITY, Hainan (CN)

( * ) Notice: Subject to any disclaimer, the term of this patent is extended or adjusted under 35 U.S.C. 154(b) by 651 days.

(21) Appl. No.: 17/593,100

(22) PCT Filed: Jun. 29, 2021

(86) PCT No.: PCT/CN2021/103288
§ 371 (c)(1),
(2) Date: Sep. 9, 2021

(87) PCT Pub. No.: WO2022/022204
PCT Pub. Date: Feb. 3, 2022

(65) Prior Publication Data
US 2022/0306548 A1    Sep. 29, 2022

(30) Foreign Application Priority Data

Jul. 27, 2020  (CN) .......................... 202010733687.5

(51) Int. Cl.
*C05F 17/20* (2020.01)
*C05F 5/00* (2006.01)
*C05G 3/80* (2020.01)

(52) U.S. Cl.
CPC ................ *C05F 17/20* (2020.01); *C05F 5/00* (2013.01); *C05G 3/80* (2020.02)

(58) Field of Classification Search
CPC . C05F 17/20; C05F 5/00; C05F 11/00; C05G 3/80; Y02W 30/40
See application file for complete search history.

(56) References Cited

FOREIGN PATENT DOCUMENTS

| CN | 108473937 A | * | 8/2018 | ............... A01C 1/06 |
| CN | 109369269 A | * | 2/2019 | ............... C05B 7/00 |

OTHER PUBLICATIONS

Deng et al., (Effects of a Compound microbial aAgent and Plants on Soil Properties, Enzyme activities, and Bacterial Composition of Pisha Sandstone), Enviromental Science and Polution Research (2021) 28:5353-53364.*

* cited by examiner

*Primary Examiner* — Zohreh A Fay
(74) *Attorney, Agent, or Firm* — JEEN IP LAW, LLC

(57) ABSTRACT

A soil microbial regulator for enhancing plant stress resistance, which includes the following components in parts by weight: 30-50 parts of coconut coir, 30-50 parts of Eucheuma, 10-30 parts of mushroom residue, 20-30 parts of Guayule and 0.4-1.6 parts of a composite bacterial agent. The present invention uses discarded mushroom residue and coconut coir as raw materials, and Guayule and Eucheuma are added; under the action of a composite bacterial agent, the raw materials are fermented; the soil microbial regulator prepared by fermentation can adjust the soil structure, improve soil microbial structure, provide sustainable nutrition for crop growth, significantly promote crop growth, improve crop resistance to diseases and insect injury, effectively reduce crop incidence rate, enhance crop resistance, realize the purpose of increasing yield and income, and achieve high and stable crop yield.

5 Claims, No Drawings

SOIL MICROBIAL REGULATOR FOR ENHANCING PLANT STRESS RESISTANCE

FIELD OF THE INVENTION

The application belongs to the field of crop cultivation, in particular to a soil microbial regulator for enhancing plant stress resistance.

BACKGROUND OF THE INVENTION

In the process of crop growth, it often faces various unfavorable factors, such as drought, waterlogging, land salinization, high temperature, low temperature, cold injury, nutrition deficiency and so on, which will lead to crop yield reduction. Especially with the development of agricultural technology, the excessive use of chemical fertilizers and pesticides has seriously damaged the ecological balance of soil, reduced the resistance of crops to various unfavorable factors, and become an important factor in yield reduction. Therefore, adjusting soil structure can not only restore soil ecological balance, but also serve as an important way to enhance plant stress resistance.

BRIEF SUMMARY OF THE INVENTION

In view of this, the soil microbial regulator for enhancing plant stress resistance is provided in the present application, which can adjust soil structure, restore soil ecological balance and enhance plant stress resistance.

The technical solution of the application is realized as follows: the soil microbial regulator for enhancing plant stress resistance, comprising the following components in parts by weight: 30-50 parts of coconut coir, 30-50 parts of Eucheuma, 10-30 parts of mushroom residue, 20-30 parts of Guayule and 0.4-1.6 parts of composite bacterial agent.

Preferably, the soil microbial regulator comprises the following components in parts by weight: 40 parts of coconut coir, 45 parts of Eucheuma, 20 parts of mushroom residue, 25 parts of Guayule and 1 part of composite bacterial agent.

Preferably, the composite bacterial agent comprises the following components in parts by weight: 0.1-0.5 parts of *Bacillus amyloliquefaciens*, 0.1-0.5 parts of *Bacillus laterosporus*, 0.1-0.3 parts of *Trichoderma asperellum*, 0.05-0.15 parts of *Paenibacillus polymyxa* and 0.05-0.15 parts of *Paecilomyces lilacinus*.

Preferably, the composite bacterial agent comprises the following components in parts by weight: 0.3 parts of *Bacillus amyloliquefaciens*, 0.3 parts of *Bacillus laterosporus*, 0.2 parts of *Trichoderma asperellum*, 0.1 part of *Paenibacillus polymyxa* and 0.1 part of *Paecilomyces lilacinus*.

A method for preparing the soil microbial regulator for enhancing plant stress resistance, which comprises the following steps:
  (1) Crushing the coconut coir, the Eucheuma, the mushroom residue and the Guayule, stirring evenly to obtain fermenting materials;
  (2) Fermenting the *Bacillus amyloliquefaciens*, the *Bacillus laterosporus*, the *Trichoderma asperellum*, the *Paenibacillus polymyxa* and the *Paecilomyces lilacinus*, after adding respectively water and stirring evenly, adding them to the fermenting materials, adjusting the water content of the materials to 30-50%, and fermenting for 5-7 days to obtain the soil microbial regulator.

Preferably, the number of effective viable bacteria in the soil microbial regulator obtained by fermentation is not less than $2.0 \times 10^8$ CFU.

Preferably, application of the soil microbial regulator for preparing a praeparatum for improving plant stress resistance.

Preferably, in the said application, the dosage of the soil microbial regulator is 30-50 kg per mu of land.

Compared with the prior art, the invention has the beneficial effects that:

The material selected in the present application, the mushroom residue is the discarded residue in mushroom cultivation, which contains rich crude protein, crude fat, calcium, phosphorus, potassium, silicon and other minerals, therefore is rich in nutrition. The coconut coir is the fiber powder of coconut shell, which is the waste produced in coconut processing. Guayule is an invasive plant; although it has not appeared in China for a long time, it is widely distributed in roadsides, wasteland and cultivated land, causing considerable damage. The present invention uses discarded mushroom residue and coconut coir as raw materials, and Guayule and Eucheuma are added; under the action of composite bacterial agent, the raw materials are fermented; the soil microbial regulator prepared by fermentation can adjust the soil structure, improve soil microbial structure, provide sustainable nutrition for crop growth, significantly promote crop growth, improve crop resistance to diseases and insect injury, effectively reduce crop incidence rate, enhance crop resistance, realize the purpose of increasing yield and income, and achieve high and stable crop yield.

DETAILED DESCRIPTION OF THE INVENTION

In order to help better understand the technical content of the present application, specific embodiments are provided below to preferably describe the present application.

The experimental methods used in the embodiments of the present application are conventional methods unless otherwise specified.

The materials, reagents and the like used in the embodiments of the present application are commercially available unless otherwise specified.

Embodiment 1

A soil microbial regulator for enhancing plant stress resistance, comprising the following components in parts by weight: 30 parts of coconut coir, 30 parts of Eucheuma, 10 parts of mushroom residue, 20 parts of Guayule, 0.1 part of *Bacillus amyloliquefaciens*, 0.1 part of *Bacillus laterosporus*, 0.1 part of *Trichoderma asperellum*, 0.05 part of *Paenibacillus polymyxa* and 0.05 part of *Paecilomyces lilacinus*.

The preparation method of the above said soil microbial regulator, comprising the following steps:
  (1) Crushing the coconut coir, the Eucheuma, the mushroom residue and the Guayule, stirring evenly to obtain fermenting materials;
  (2) Fermenting the *Bacillus amyloliquefaciens*, the *Bacillus laterosporus*, the *Trichoderma asperellum*, the *Paenibacillus polymyxa* and the *Paecilomyces lilacinus*, after adding respectively water and stirring evenly, adding them to the fermenting materials, adjusting the water content of the materials to 30-50%, fermenting for 5 days, and the number of effective viable bacteria being not less than $2.0 \times 10^8$ CFU, thus obtaining the soil microbial regulator.

Embodiment 2

A soil microbial regulator for enhancing plant stress resistance, comprising the following components in parts by weight: 50 parts of coconut coir, 50 parts of Eucheuma, 30 parts of mushroom residue, 30 parts of Guayule, 0.5 parts of *Bacillus amyloliquefaciens*, 0.5 parts of *Bacillus laterosporus*, 0.3 parts of *Trichoderma asperellum*, 0.15 parts of *Paenibacillus polymyxa* and 0.15 parts of *Paecilomyces lilacinus*.

The preparation method of the above said soil microbial regulator, comprising the following steps:
  (1) Crushing the coconut coir, the Eucheuma, the mushroom residue and the Guayule, stirring evenly to obtain fermenting materials;
  (2) Fermenting the *Bacillus amyloliquefaciens*, the *Bacillus laterosporus*, the *Trichoderma asperellum*, the *Paenibacillus polymyxa* and the *Paecilomyces lilacinus*, after adding water and stirring evenly, adding them to the fermenting materials, adjusting the water content of the materials to 30-50%, fermenting for 6 days, and the number of effective viable bacteria being not less than $2.0 \times 10^8$ CFU, thus obtaining the soil microbial regulator.

Embodiment 3

Soil microbial regulators for enhancing plant stress resistance, comprising the following components in parts by weight: 40 parts of coconut coir, 45 parts of Eucheuma, 20 parts of mushroom residue, 25 parts of Guayule, 0.3 parts of *Bacillus amyloliquefaciens*, 0.3 parts of *Bacillus laterosporus*, 0.2 parts of *Trichoderma asperellum*, 0.1 part of *Paenibacillus polymyxa* and 0.1 part of *Paecilomyces lilacinus*. The preparation method of the above said soil microbial regulator, comprising the following steps:
  (1) Crushing the coconut coir, the Eucheuma, the mushroom residue and the Guayule, stirring evenly to obtain fermented materials;
  (2) Fermenting the *Bacillus amyloliquefaciens*, the *Bacillus laterosporus, Trichoderma asperellum*, the *Paenibacillus polymyxa* and the *Paecilomyces lilacinus* after adding water and stirring evenly, adding them to the fermenting materials, adjusting the water content of the materials to 30-50%, fermenting for 7 days, and the number of effective viable bacteria being not less than $2.0 \times 10^8$ CFU, thus obtaining the soil microbial regulator.

1. Investigation on the Effect of the Said Soil Microbial Regulator on Crop Growth Promotion After randomly selecting plots with similar location and soil conditions, 50 Chinese cabbages (scientific name being *Brassica chinensis* L) and 50 strawberries were planted in each plot, and they are directly cultivated in the soil by using different fertilizers as basal fertilizers. The fertilizer proportion is shown in Table 1.

TABLE 1

Statistics of different treatment methods

| | Basal fertilizer composition |
|---|---|
| Experimental group 1 | Embodiment 1 |
| Experimental group 2 | Embodiment 2 |
| Experimental group 3 | Embodiment 3 |
| Control group 1 | the fermenting materials were directly fermented according to the method of Embodiment 3 without adding the composite bacterial agent |
| Control group 2 | prepared with composite bacterial agent according to the ratio of Embodiment 3 |
| Control group 3 | treated with commercially available a ternary compound fertilizer(compound fertilizer mixed with nitrogen, phosphorus and potassium)(15-15-15) |

The same amount of the composite bacterial agent (0.38 kg) as that in Embodiment 3 was applied in the Control group 2, and a standard of 50 kg per mu of land was applied to the other groups. During the experiment, normal irrigation and no pest control were carried out. Statistics were collected after 20 days of sowing of the Chinese cabbages, and statistics were collected after all strawberries were harvested. The specific statistical results are shown in Table 2 and Table 3.

TABLE 2

Effects of different treatment methods on the growth of Shanghai cabbage

| | Average weight per plant (g) | Incidence rate (%) | Growth period (days) |
|---|---|---|---|
| Experimental group 1 | 31.5 | 6.0 | 20 |
| Experimental group 2 | 30.8 | 4.0 | 20 |
| Experimental group 3 | 32.6 | 4.0 | 18 |
| Control group 1 | 21.9 | 18.0 | 23 |
| Control group 2 | 18.7 | 30.0 | 25 |
| Control group 3 | 23.4 | 24.0 | 21 |

It can be seen from Table 2 that by applying the soil microbial regulators prepared in the 3 embodiments of the present application, the average weight per plant of Chinese cabbage increased, the growth period was obviously shortened in different degrees, and the growth of Chinese cabbage was obviously promoted. The incidence of Chinese cabbage was obviously reduced, and the resistance to diseases and insect injury of Chinese cabbage was improved, and the stress resistance of Chinese cabbage was increased.

TABLE 3

Effects of different treatments on strawberry growth

| | Average fruit weight (g) | Average yield per plant (g) | Incidence rate (%) |
|---|---|---|---|
| Experimental group 1 | 23.4 | 340.8 | 10.0 |
| Experimental group 2 | 22.5 | 342.0 | 10.0 |
| Experimental group 3 | 24.7 | 348.1 | 6.0 |
| Control group 1 | 20.1 | 319.2 | 28.0 |
| Control group 2 | 18.3 | 294.5 | 36.0 |
| Control group 3 | 21.8 | 326.7 | 22.0 |

It can be seen from Table 3 that by applying the soil microbial regulators prepared in the 3 embodiments of the present application, the average weight per fruit of strawberry was improved, the yield per plant thereof was obviously increased, the incidence rate thereof was greatly reduced, and the stress resistance thereof was obviously enhanced.

The foregoing description is only preferred embodiments of the present application, and is not intended to limit the present application; any modification, equivalent replacement, improvement, etc. made within the spirit and principles of the present application shall be included in the scope of protection of the present application.

The invention claimed is:

1. A method for preparing a soil microbial regulator for enhancing plant stress resistance,
wherein the soil microbial regulator for enhancing plant stress resistance comprises in parts by weight: 30-50 parts of coconut coir, 30-50 parts of Eucheuma, 10-30 parts of mushroom residue, 20-30 parts of Guayule and 0.4-1.6 parts of a composite bacterial agent;
wherein, the composite bacterial agent comprises in parts by weight: 0.1-0.5 parts of *Bacillus amyloliquefaciens*, 0.1-0.5 parts of *Bacillus laterosporus*, 0.1-0.3 parts of *Trichoderma asperellum*, 0.05-0.15 parts of *Paenibacillus polymyxa* and 0.05-0.15 parts of *Paecilomyces lilacinus*; and
the method comprises steps of: (1) crushing the coconut coir, the Eucheuma, the mushroom residue and the Guayule, and stirring evenly to obtain fermenting materials: (2) fermenting the composite bacterial agent comprising the *Bacillus amyloliquefaciens*, the *Bacillus laterosporus*, the *Trichoderma asperellum*, the *Paenibacillus polymyxa* and the *Paecilomyces lilacinus*, after adding respectively water and stirring evenly, adding composite bacterial agent to the fermenting materials, adjusting the water content of the materials by 30-50%, and fermenting for 5-7 days to obtain the soil microbial regulator.

2. The method for preparing the soil microbial regulator for enhancing plant stress resistance according to claim 1, wherein the soil microbial regulator for enhancing plant stress resistance comprises in parts by weight: 40 parts of coconut coir, 45 parts of Eucheuma, 20 parts of mushroom residue, 25 parts of Guayule and 1 part of composite bacterial agent.

3. The method for preparing the soil microbial regulator for enhancing plant stress resistance according to claim 1, wherein the composite bacterial agent comprises in parts by weight: 0.3 parts of *Bacillus amyloliquefaciens*, 0.3 parts of *Bacillus laterosporus*, 0.2 parts of *Trichoderma asperellum*, 0.1 part of *Paenibacillus polymyxa* and 0.1 part of *Paecilomyces* lilacinus.

4. The method for preparing the soil microbial regulator for enhancing plant stress resistance according to claim 1, wherein a number of effective viable bacteria in the soil microbial regulator obtained by fermentation is not less than $2.0 \times 10^8$ CFU.

5. The method for preparing the soil microbial regulator for enhancing plant stress resistance according to claim 1, wherein, when the soil microbial regulator is used to improve plant stress resistance, a dosage of the soil microbial regulator is 30-50 kg per mu of land.

* * * * *